March 13, 1962
W. F. DAMERON
3,025,398
METHOD AND APPARATUS FOR DETERMINING
DEPTH OF WELL SAMPLES
Filed Nov. 4, 1957
2 Sheets-Sheet 1
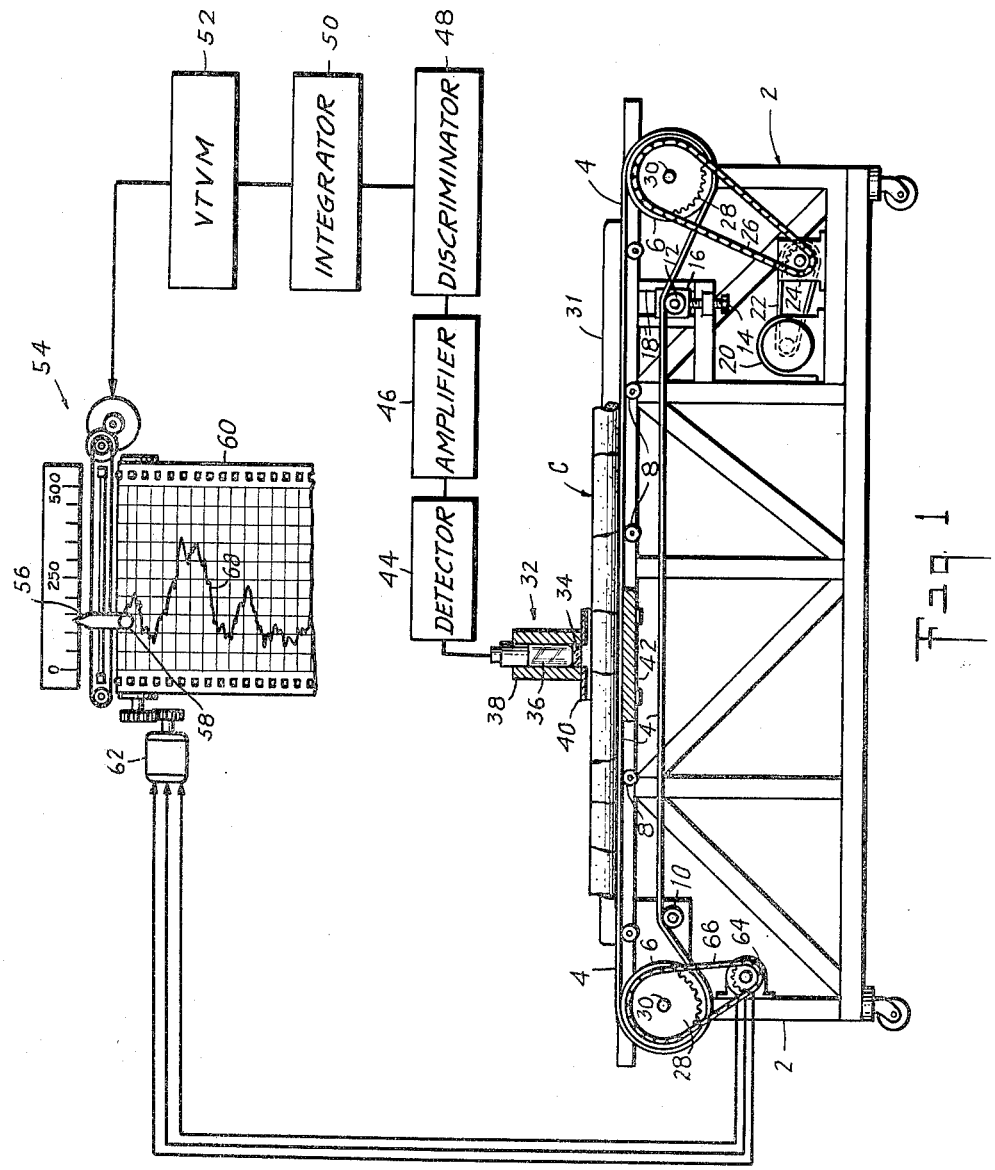
INVENTOR
WYLLIE F. DAMERON
BY
Curtis Morris & Safford
ATTORNEYS

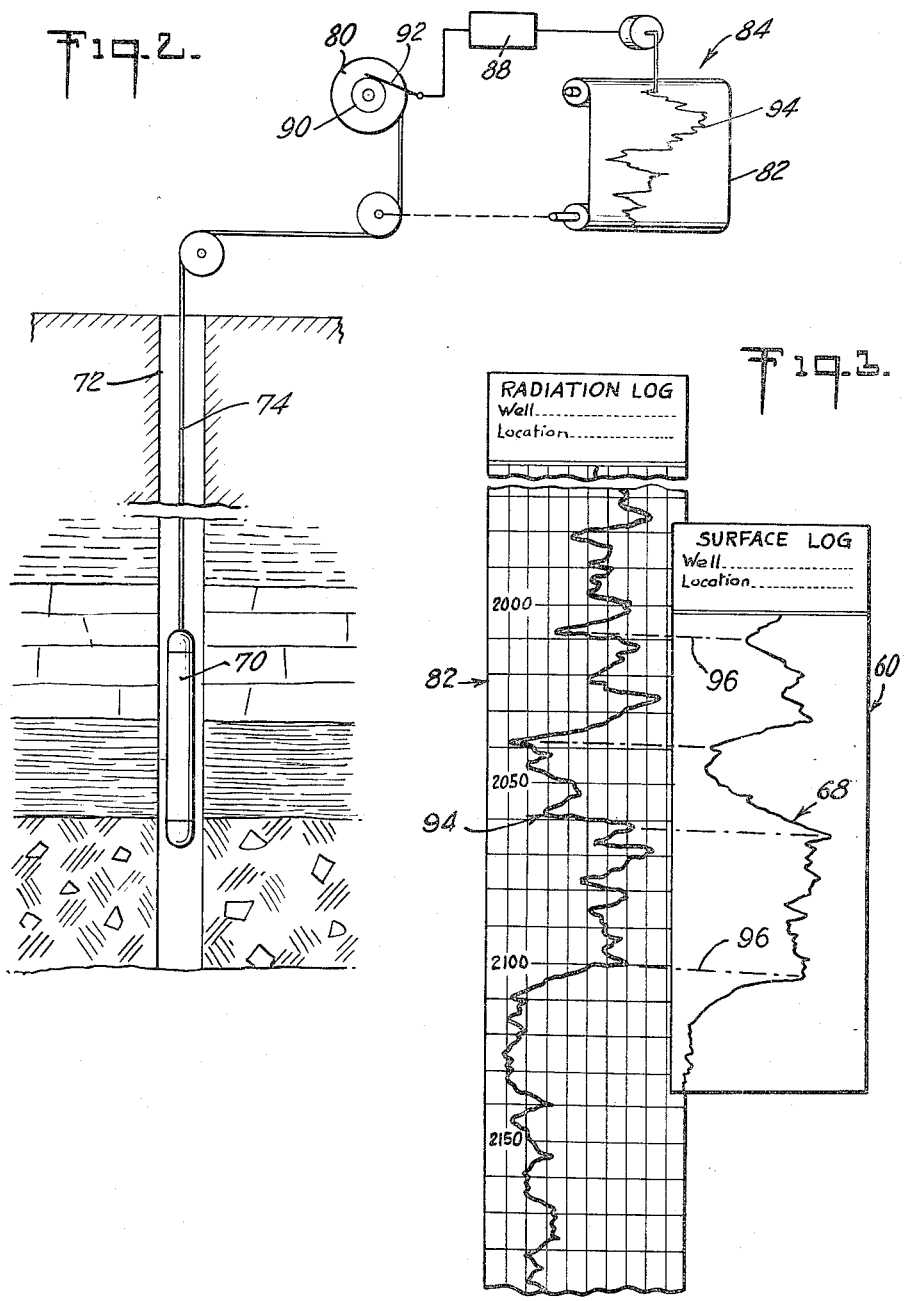

United States Patent Office 3,025,398
Patented Mar. 13, 1962

3,025,398
METHOD AND APPARATUS FOR DETERMINING DEPTH OF WELL SAMPLES
Wyllie F. Dameron, Midland, Tex., assignor to Core Laboratories, Inc., Midland, Tex.
Filed Nov. 4, 1957, Ser. No. 694,198
3 Claims. (Cl. 250—83.3)

This invention relates to a method and apparatus for determining the depth from which samples of underground formations were taken from a well bore.

Particularly in the drilling of an oil or gas well, it is customary to take core samples of formations traversed by the bore hole. When the drilling approaches a formation which is believed to contain oil or gas, the driller usually changes to a coring bit and takes core samples of this formation for analysis to determine whether the formation is in fact commercially productive. It is extremely important to know the exact wire-line-measured depth of the formation from which the core samples were taken. In some instances, the productive zone may be only a few feet thick and there may be a water-producing zone adjacent to it. If the casing is perforated at the wrong depth, the well will produce water instead of oil or gas. Under certain conditions, once a casing has been perforated opposite a water-producing zone, it is a practical impossibility to cement off this zone, and in some instances such wells have had to be abandoned, at great financial loss.

Heretofore, it has been extremely difficult to ascertain the exact depth from which core samples were taken. One of the principal problems has been that in many instances substantially less than 100% core recovery is obtained. For example, in the coring of a 50-foot section, only 30 feet of core may be recovered, so that there may be an error as great as 20 feet in estimating the portion of the cored section of the well bore from which the recovered samples came. The use of diamond core bits has to some extent alleviated this problem by increasing the percentage of core recovery. However, there still has remained a very considerable difficulty due to the fact that the depth from which the core samples were taken has been approximated by counting of the number of joints of drill pipe in use, whereas the depth of perforation is obtained by measurement of the length of wire line on which the perforator is lowered into the well. Due to a number of factors, such as elongation of the wire line or of the drill stem, miscounting of the number of joints in the drill stem, inaccuracy in the measurement of the length of wire line payed out, etc., there has been a disparity between the two measurements and a resulting lack of correlation between the analytical data and the well completion procedure.

The present invention provides a practical means and method for readily determining, with much greater exactitude than has heretofore been possible, the depth from which cores or other formation samples were taken from a bore hole. In general terms, this is accomplished by making a radiation log of the core samples, arranged in the order in which they were taken from the well, and correlating the same with a radiation log taken in the bore hole.

FIGURE 1 shows, in part diagrammatically, an illustrative apparatus for making a radiation log of core samples in accordance with this invention.

FIGURE 2 is a diagrammatic illustration of an illustrative apparatus for making the downhole radiation log.

FIGURE 3 is a diagrammatic illustration of the side-by-side comparison of the two logs.

In the particular apparatus and method disclosed in this application, gamma ray logs are made. However, the invention is not limited to gamma radiation; it may involve any other type of radiation which is susceptible to measurement and correlation. Moreover, the radiation may be either natural or induced, for example by neutron bombardment.

In the apparatus shown in the drawing, the core samples C are conveyed along a table 2 by a conveyor belt 4 which is trained on drums 6 rotatably supported at either end of table 2. The upper span of the conveyor belt 4 is supported on rollers 8 and the belt is tensioned by means of rollers 10 and 12 which engage the lower span of the belt 4, the roller 12 being adjustable by means of bolts 14 which engage the blocks 16 in which the shaft of the roller 12 is journaled and which are supported for vertical sliding movement in rails 18 mounted on table 2.

One of the drums 6 is driven by an electric motor 20 through a belt 22, a reduction gear 24, a chain 26 and a sprocket 28 keyed to the same shaft 30 on which the drum 6 is fixed. The reduction gear 24 may advantageously be constructed to provide for variation of the linear speed of the conveyor belt 4; for example, it may provide for a linear speed of either 2 or 5 feet per minute.

The core samples C are arranged on the conveyor belt 4 in an order corresponding to the relative positions they respectively occupied prior to their removal from the bore hole. The core samples are laterally guided by side rails 31, which may be adjustable to accommodate different sizes of core. They are conveyed by a belt 4 past a gamma ray sensitive device, generally indicated 32, for example a scintillator, which includes a crystal 34 of scintillating material and photomultiplier tube 36 mounted in a cylindrical lead shield 38 on top of a supporting arch 40 which is adjustably mounted on table 2 to position the crystal 34 close to the surface of the core samples. A lead plate 42 positioned beneath the belt 4 opposite the radiation sensitive device prevents extraneous radiation from reaching the crystal 34 from below, while the shield 38 and arch 40 protects the crystal against radiation from the side or from above.

As the core samples C move beneath the sensitive device 32, gamma radiation from the core samples excites the crystal 34, causing it to scintillate, and these extremely brief and faint flashes are amplified by the photomultiplier tube 36 to form electrical pulses which are passed to a detector 44, amplifier 46, discriminator 48 and integrator 50 to produce a D.-C. voltage varying in accordance with the intensity of the radiation. The vacuum tube voltmeter 52 is used to indicate the level of this voltage, and the voltage signal is also fed to a recorder, generally indicated 54, to cause displacement of the needle 56 and pen 58 thereof a distance from the zero position or baseline proportional to the amplitude of the signal voltage.

The chart 60 of the recorder is driven by a selsyn slave unit 62 which is controlled by a selsyn transmitter unit 64 driven in step with the belt 4 through a chain 66 and a sprocket 28 keyed on the same shaft 30 on which one of the drums 6 is fixed. Thus the movement of the chart 60 is at all times synchronized with the movements of the conveyor belt 4 so that the linear graduations on the chart 60 correspond to units of length of the core. As the chart 60 is driven by the slave unit 62 the pin 58 of the recorder 54 will therefore trace on the chart a graphic plot 68 of the intensity of radiation versus the length of the core—i.e. the depth of the well.

This chart 60 may be laid side by side with a similar chart made by moving a radiation sensitive device along the bore hole. FIGURE 2 diagrammatically illustrates the making of the downhole radiation log. As may be seen in that figure, a radiation-sensitive sonde 70 is moved unidirectionally along the borehole 72 by means of a wireline 74 which is fed around pulleys 76 and 78 to and from a reel 80. The pulley 78 is coupled to drive the chart 82 of a recorder generally designated 84. The pen 86 of the recorder 84 is driven through a detector-amplifier circuit 88 which receives signals from the radiation-sensitive device within the sonde 70 through slip rings 90 and brushes 92 on the hub of the reel 80.

Thus the plot 94 made on the chart 82 is a plot of radiation detected by the sonde 70 versus depth. Preferably, the vertical or depth scale of this plot 94 is approximately equal to that of the plot 60, FIGURE 1, to facilitate correlation.

FIGURE 3 illustrates the correlation of the two charts. The two plots are arranged in proximity to one another, with their longitudinal axes generally parallel. The two charts are shifted longitudinally relative to one another to a point where their characteristic curvatures most nearly match, as indicated diagrammatically by the broken lines 96, interconnecting corresponding salient points on the two charts.

The depth indications on the downhole log may now be transferred to the radiation log made on the core samples, to permit the depth from which any individual core sample was taken from the well to be read directly from the latter log, or, if desired, both plots, in proper relative vertical positions, may be printed on the same sheet, for example by photocopying.

Thus it is possible to ascibe to the individual core samples depth measurements which were obtained by the wire line method; these depth measurements form a reliable basis for well completion procedures such as perforation, since the perforating gun is lowered into the borehole on the same or a similar wire line apparatus on which the radiation sonde was supported. This eliminates any discrepancy due to elongation of the wire line or inaccuracy of calibration of the depth counter driven from the wire line reel—that is to say, the accuracy of the method depends not upon absolute calibration of the depth counter but only upon its reproducibility. Alternatively, the perforating device may be equipped with a gamma ray detector which may be used to position the perforator at the depth corresponding to a particular point on the gamma ray characteristic curve.

It will therefore be appreciated that the present invention provides a practical method and apparatus for accurate determination of the depth from which formation samples are taken. However, it should be emphasized that the particular embodiment of the invention which is disclosed herein and shown in the accompanying drawing is intended as merely illustrative of the principles of the invention rather than as restrictive of the scope thereof or of the coverage of this patent, which is limited only by the appended claims, as interpreted in the light of the prior art.

I claim:
1. The method of locating the underground formations from which core samples were taken which comprises moving a radiation-sensitive device along a bore hole traversing said formations and making a record of the intensity of radiation detected thereby at various depths, subjecting a radiation sensitive device to the action of said core samples, and making a record of the intensity of radiation detected from each of said core samples versus the relative depths from which they were taken, and correlating the two said records.

2. The method of determining the relative depths at which core samples were taken from a well bore hole which comprises moving a radiation-sensitive device along said bore hole and making a graphic record of the intensity of the radiation detected thereby versus depth, placing said core samples in a line in the same sequence as the relative positions they occupied prior to removal from said bore hole, placing a radiation-sensitive device adjacent said line of core samples and moving said radiation-sensitive device and said line of core samples longitudinally relative to one another while making a graphic record of the intensity of radiation detected by the device, and correlating the two said records.

3. The method of determining wire-line-measured depths at which core samples were taken from a well bore hole which comprises moving a radiation-sensitive device along said bore hole on a wire line and plotting on one sheet a graph of the intensity of the radiation detected thereby versus the wire-line-measured depth, placing said core samples in a line in the same sequence as the relative positions they occupied prior to removal from said bore hole, placing a radiation sensitive device adjacent said line of core samples, moving said radiation-sensitive device and said line of core samples longitudinally relative to one another and plotting on a second sheet a graph of the intensity of radiation detected during such movement, placing said two sheets adjacent to one another with the axes of said graphs generally parallel, and moving said sheets longitudinally relative to one another to the point where the characteristic curvatures of said graphs most nearly match.

References Cited in the file of this patent
UNITED STATES PATENTS

| | | |
|---|---|---|
| 2,214,674 | Hayward | Sept. 10, 1940 |
| 2,394,703 | Lipson | Feb. 12, 1946 |
| 2,586,303 | Clarke | Feb. 19, 1952 |
| 2,826,076 | Boretz et al. | Mar. 11, 1958 |